G. A. LYON.
RESILIENT AUTOMOBILE BUFFER.
APPLICATION FILED SEPT. 18, 1919.
1,325,745. Patented Dec. 23, 1919.
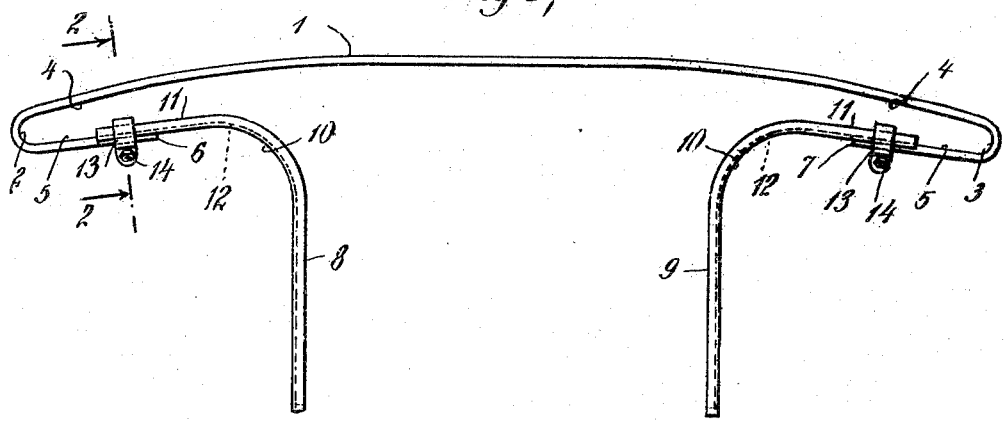
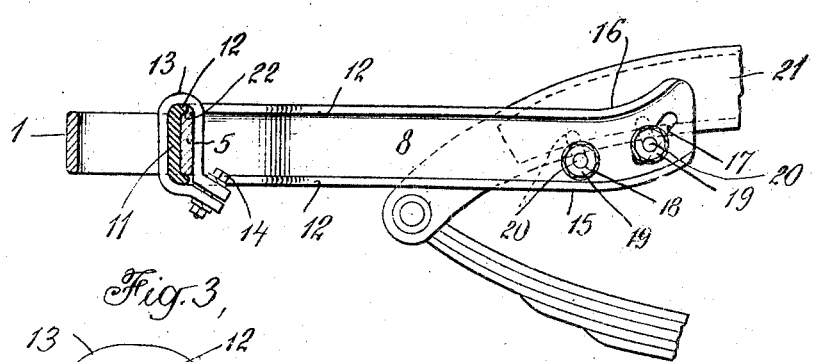
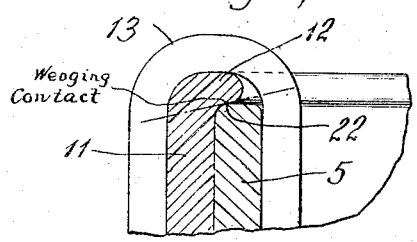

UNITED STATES PATENT OFFICE.

GEORGE ALBERT LYON, OF PHILADELPHIA, PENNSYLVANIA.

RESILIENT AUTOMOBILE-BUFFER.

1,325,745.  Specification of Letters Patent.  Patented Dec. 23, 1919.

Application filed September 18, 1919. Serial No. 324,293.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Resilient Automobile-Buffers, of which the following is a specification, taken in connection with the accompanying drawing.

This invention which is a continuation in part of my co-pending application, Serial No. 310,937, filed July 15, 1919, that is, contains subject-matter taken therefrom, relates especially to automobile or other vehicle buffers formed of resilient strip steel or other metal in which the attaching members have their connector portions which coöperate with or engage the buffer front member preferably formed with low or slightly projecting alining flanges which may project no more than about the thickness of the attaching members and which preferably have inclined or somewhat wedging inner sides so as to engage and grip the coöperating buffer member. The buffer front member which may be of spring steel or other resilient strip metal has connector portions which may be of substantially flat cross-section preferably with somewhat rounded edges and of such shape as to have proper alining action in connection with the channeled section connector portions of the attaching members with which they coöperate, and it is also desirable to have the buffer front member formed with integral end loops adapted to project into protective position in front of the wheels of the automobile or other vehicle and have substantially straight inturned connector portions where substantial lateral adjustment is to be secured with respect to the attaching members. For this purpose clamping means of any suitable character may be used to adjustably and releasably connect these coöperating connector portions and a frictional bolted clip which substantially embraces the intermediate or central parts of these connector portions may be advantageously used for this purpose and may force the connector portions together so as to rigidly and reliably clamp them in the desired alined position.

In the accompanying drawing which shows in a somewhat diagrammatic way an illustrative embodiment of this invention, Figure 1 is a plan view of a buffer.

Fig. 2 is a transverse section thereof taken substantially along the line 2—2 of Fig. 1; and Fig. 3 is an enlarged partial sectional view of the connector portions.

The resilient buffer front member may as shown in Fig. 1 consist of a single resilient strip of tempered spring steel, for example, and may comprise the end loops 2, 3 adapted to project into protective position in front of the automobile wheels and preferably having substantially straight inturned connector portions 5 which may be nearly parallel to the coöperating or adjacent front parts 4 of this member or may inwardly diverge therefrom at a slight angle as indicated. These end loop portions may merge into curved portions toward the center of the buffer front member and if desired in some cases a substantially straight middle portion 1 may be provided, although this is not in all cases necessary. A buffer front member of this character may be conveniently bent to shape while heated by forcing or bending the strip around a form and then hardening and tempering the same if desired so as to secure the desired degree of resilient strength.

The coöperating attaching members connecting the buffer front to the automobile frame or other part of the vehicle may advantageously be formed of resilient strip such as tempered spring steel and these attaching members 8, 9 may each comprise a forwardly and outwardly bent portion 10 merging into a connector portion 11 which is preferably substantially straight and has a channeled section of such size and shape as to coöperate with the inturned connector portion 5 at that end of the buffer front member. The alining flanges 12 which are preferably at the edges of this connector portion are also advantageously formed on their inner sides with a slightly inclined or wedging contour so as to have the desired gripping alining action on the coöperating connector portions of the buffer front member when these two parts are forced together by the clamping means employed. It is also in some cases advantageous to form the entire or at least a large part of the attaching members of channel sectioned strip in which to facilitate bending, etc., the edge flanges 12 project only about the thickness of the strip beyond the inner face thereof and Fig. 3 shows some proportions which give good results under these conditions when used with spring steel strip members about ⅜ths of an inch thick. These alining flanges 12 may project about a quarter of an inch beyond the inner or flat face of the spring channel member 11 and their inner sides 22 are preferably formed with a slightly inclined or wedging contour so as to have a gripping engagement on the coöperating buffer strip 5 which may be forced 'tween them and which may advantageously be formed with rounded or relieved edges of about the character indicated. These edge flanges may sometimes be bent down or flattened into the plane of the strip at the rear of these attaching members or the flanged strip ends may sometimes be bent vertically as indicated in Fig. 2 so as to form the upwardly extending ends 16 which may be provided with adjusting apertures such as the slot 17 and hole 18 to accommodate the stems of the hookbolts or other attaching devices 20 securing the same to the frame member 21 of the automobile, for instance, as through the action of the nuts 19. Additional stiffness is of course secured by leaving the upper flange in its normal projecting position at the point 16 of this part of the attaching member, as indicated in Fig. 2.

As shown in Fig. 1, the connector portions of these buffer members may when they are formed substantially straight give a considerable range of lateral adjustment to the attaching members so that they may fit automobiles having frame members located at different distances apart since through the alining or gripping engagement of the alining flanges which may be formed on the attaching members a sufficiently strong and rigid connection may be secured by an overlap of three or four inches or more when an effective clamping device such as the inclosing clip 13 is used to force these connector portions adjacent their center. Such a frictional clamping device may of course be slipped or forced over the interlocked connector portions when this clip is in its opened or released position and then the bolt 14 may be tightened so as to force these connector portions together into gripping alining coöperation which usually gives a sufficiently rigid and strong connection between the buffer members when an overlap of four inches or so is secured beyond the ends 6, 7 of the inturned connector portions of the buffer front member. In this way an ample range of adjustment can readily be secured since each of the attaching members may be moved outward as much as six or more inches beyond the position shown in Fig. 1 and still secure proper coöperation between the substantially straight connector portions and of course the greater overlap secured in such cases insures a still more rigid and effective connection betweent the parts. Of course where such tight fitting or wedging flanges are employed on the connecting portions of the attaching members care must be taken in bending or forming the channel strip attaching members so as not to deform their alining flanges throughout the connector portions thereof and this is facilitated by making the connector portions substantially straight and by having the form around this part of the hot strip may be bent of such shape so as to principally or entirely engage the intermediate flat portion of the attaching member. In some cases also the flanged connector portions thereof may be engaged by accurately fitting shaping dies or formers in connection with this bending operation or otherwise, so that the accurate positioning and spacing of these alining flanges may be insured in this way or they may be subsequently ground or otherwise finished and sized in any suitable way, if desired.

This buffer may of course be readily taken apart and put together and adjusted on an automobile by the ordinary chauffeur or car owner without special tools or appliances, it being naturally understood that the attaching members are of such form and construction as to be adapted to be clamped or otherwise secured to the automobile frame. When disconnected the parts of this buffer may be readily packed and stored and shipped which is also an important consideration in this connection.

This invention has been described in connection with a number of embodiments, forms, proportions, parts, arrangements, materials, methods of manufacture, connection and use, to the details of which disclosure the invention is not of course to be limited, since what is claimed as new and what is desired to be secured by Letters Patent is set forth in the appended claims.

I claim—

1. The automobile buffer comprising a resilient buffer front member formed of spring steel strip, said buffer front member having rearwardly bent integral end loop portions adapted to project into protective position in front of the vehicle wheels and having integral inturned substantially straight connector portions, channeled sectioned spring steel strip attaching members having forwardly and outwardly curved portions and integral substantially straight connector portions having slightly projecting gripping alining flanges provided with inclined wedging inner sides adapted to coöperate with the inturned connector portions of said buffer front member and have substantially tight wedging engagement therewith and frictional clip clamping means inclosing the coöperating connector portions adjacent each end of the buffer and forcing them together.

2. The automobile buffer comprising a resilient buffer front member formed of spring steel strip, said buffer front member having integral end loop portions adapted to project into protective position in front of the vehicle wheels and having integral inturned substantially straight connector portions, channeled sectioned spring steel strip attaching members having integral substantially straight connector portions having slightly projecting gripping alining flanges provided with wedging inner sides adapted to coöperate with the inturned connector portions of said buffer front member and have substantially tight wedging engagement therewith and clamping means engaging the coöperating connector portions adjacent each end of the buffer and forcing them together.

3. The automobile buffer comprising a resilient buffer front member having integral end loop portions adapted to project into protective position in front of the vehicle wheels and having integral inturned substantially straight connector portions, spring steel strip attaching members having forwardly and outwardly curved portions and integral substantially straight channel section connector portions having slightly projecting gripping alining flanges adapted to adjustably coöperate with the inturned connector portions of said buffer front member and have substantially tight engagement therewith and clamping means engaging coöperating connector portions adjacent each end of the buffer and holding them together.

4. The automobile buffer comprising a resilient buffer front member having integral end loop portions adapted to project into protective position in front of the vehicle wheels and having integral inturned connector portions, resilient strip attaching members having curved portions and integral channel section connector portions having alining flanges adapted to adjustably coöperate with the inturned connector portions of said buffer front member and clamping means coöperating with the connector portions adjacent each end of the buffer and holding them together.

5. The automobile buffer comprising a vertically rigid and horizontally resilient buffer front member having integral inturned substantially straight connector portions, channel sectioned resilient attaching members having integral substantially straight connector portions each having a plurality of slightly projecting alining edge flanges adapted to adjustably coöperate with the connector portions of said buffer front member and clamping means coöperating with the connector portions adjacent each end of the buffer.

6. The automobile buffer comprising a resilient buffer front member having substantially straight connector portions, channel sectioned attaching members having integral substantially straight connector portions each having a plurality of gripping alining edge flanges adapted to coöperate with the connector portions of said buffer front member and have substantially tight engagement therewith and clamping means inclosing the coöperating connector portions adjacent each end of the buffer.

7. The automobile buffer comprising a resilient buffer front member having connector portions, attaching members having integral connector portions each having a plurality of alining flanges adapted to coöperate with the connector portions of said buffer front member and clamping means engaging the coöperating connector portions adjacent each end of the buffer.

GEORGE ALBERT LYON.